United States Patent [19]

Fässle

[11] 4,234,345
[45] Nov. 18, 1980

[54] METHOD FOR PRODUCING HARD PLASTER OF PARIS

[75] Inventor: Fritz Fässle, Limburgerhof, Fed. Rep. of Germany

[73] Assignee: Guilini Chemie GmbH, Ludwigshafen am Rhein, Fed. Rep. of Germany

[21] Appl. No.: 83,834

[22] Filed: Oct. 11, 1979

[30] Foreign Application Priority Data

Oct. 11, 1978 [DE] Fed. Rep. of Germany ....... 2844266

[51] Int. Cl.$^3$ .................. C01F 11/46; C04B 11/00
[52] U.S. Cl. .................. 106/110; 423/172; 423/555
[58] Field of Search .................. 106/109, 110, 111; 423/171, 172, 555

[56] References Cited

U.S. PATENT DOCUMENTS

| | | | |
|---|---|---|---|
| 1,901,051 | 3/1933 | Randel | 423/172 |
| 2,341,426 | 2/1944 | Dailey | 106/110 |
| 3,083,110 | 3/1963 | Preston | 106/111 |
| 3,305,375 | 2/1967 | Jakacki | 106/109 |
| 3,337,298 | 8/1967 | Ruter | 106/110 |
| 3,410,655 | 11/1968 | Ruter | 423/555 |
| 3,723,146 | 3/1973 | Lane | 106/110 |
| 3,913,571 | 10/1975 | Bayer | 106/110 |

FOREIGN PATENT DOCUMENTS

| | | |
|---|---|---|
| 2006366 | 8/1971 | Fed. Rep. of Germany . |
| 2115808 | 10/1972 | Fed. Rep. of Germany ........... 423/555 |
| 1592121 | 8/1975 | Fed. Rep. of Germany . |
| 2631031 | 1/1977 | Fed. Rep. of Germany ........... 106/111 |
| 2021551 | 7/1970 | France . |
| 78948 | 1/1971 | German Democratic Rep. . |
| 36684 | 5/1978 | Ireland . |
| 43758 | 6/1972 | Japan ........................... 423/555 |
| 95321 | 7/1975 | Japan ........................... 106/109 |
| 1243092 | 8/1971 | United Kingdom . |

OTHER PUBLICATIONS

Anderson, J., *Applied Dental Materials,* Blackwell Scientific Publications, Oxford, England, (1967) pp. 179-192.

*Primary Examiner*—Brian E. Hearn
*Attorney, Agent, or Firm*—Spencer & Kaye

[57] ABSTRACT

Fast-setting alpha calcium sulfate hemihydrate made from calcium sulfate dihydrate by hydrothermally recrystallizing calcium sulfate dihydrate to form a mixture containing 95%-99% by weight alpha calcium sulfate hemihydrate and 5 to 1% calcium sulfate dihydrate. The dihydrate in this mixture is then converted to beta calcium sulfate hemihydrate by calcining, except for a remainder of up to 0.5 percent of dihydrate, which remains in the mixture.

15 Claims, No Drawings

METHOD FOR PRODUCING HARD PLASTER OF PARIS

BACKGROUND OF THE INVENTION

The present invention relates to a method for producing hard plaster of paris having very short setting times and high strength values.

Hard plaster of paris refers to calcium sulfate hemihydrates which contain as their major component alpha calcium sulfate hemihydrate. During the setting process, these hemihydrates rehydrate to form the dihydrate, and as indicated by the term "hard plaster of paris" they reach high strength values after setting and are therefore very well suited, according to U.S. Pat. No. 1,901,051, for the production of plaster casts. Due to the high strength values of the plaster, the weight of the plaster casts can be kept relatively low.

The plaster of paris used for plaster casts must have a short setting time, about three minutes or less being desirable, as well as a high degree of whiteness. Moreover, during setting the plaster casts should not secrete a film of water on their surfaces, and the setting process should not produce too high an exothermal reaction which could lead to skin burns.

In U.S. Pat. No. 3,913,571 it is proposed, for the production of plaster casts, to use an alpha calcium sulfate hemihydrate which has been produced by means of a hydrothermal recrystallization process and has been comminuted to a prescribed average grain size by way of very fine grinding in a grinding assembly. In accordance with the process disclosed in U.S. Pat. No. 3,913,571, the use of hydrothermally produced alpha calcium sulfate hemihydrate which has been ground to an average grain size of less than $7\mu$, preferably less than $5\mu$, results in improved strength characteristics and good processing properties. Optimum results are attained if the axial ratio of the hemihydrate crystals before grinding is at least 1:2 and no more than 1:5. One drawback of this process is, however, that the very fine grinding causes the development of excessive heat during setting.

Further, it is known that the setting times of alpha calcium sulfate hemihydrate are much longer than those of beta calcium sulfate hemihydrate. For that reason, accelerators such as calcium sulfate dihydrate and potassium sulfate are generally added to the hard plasters used in plaster casts. Both of these substances have an accelerating effect when dispersed very finely. The addition of beta calcium sulfate hemihydrate causes no or only an insufficient accelerating effect.

Mixtures of alpha and beta calcium hemihydrate are known and are used in industry in various fields. Due to their high water absorption capability they are used extensively, for example, in the ceramics industry, according to German Offenlegungsschrift No. 1,805,126, as a modelling and molding plaster of paris. However, the plaster mixtures preferred for these purposes, which consist of 15 to 40 percent by weight alpha hemihydrate and 85-60 percent by weight beta hemihydrate, do not exhibit the short setting times and increased mechanical strength which is required of plasters used in other applications, for example, for medical purposes. The addition of accelerators to these mixtures is necessary to attain reasonable setting periods, and the addition of these accelerators leads to a reduction in strength of the plaster.

SUMMARY OF THE INVENTION

It has now been found that the properties of hard plasters produced according to the prior art methods and used, if required, in plaster casts, can be improved significantly.

To achieve the foregoing advantages, and in accordance with its purpose, the present invention provides a method for producing fast-setting alpha calcium sulfate hemihydrate from calcium sulfate dihydrate, comprising: hydrothermally recrystallizing, at $pH \leq 3$, in the presence of a substance which influences the tendency to form crystals, calcium sulfate dihydrate to form a mixture comprising 95% to 99% by weight of alpha calcium sulfate hemihydrate having an axial ratio of 1:8 to 1:12, and 1% to 5% calcium sulfate dihydrate; treating the mixture by drying the hemihydrate and calcining the dihydrate to form beta calcium sulfate hemihydrate while leaving a remainder of dihydrate, the calcining leaving no more than 0.5% of the total weight of the calcium sulfate in dihydrate form; and grinding the treated mixture to an average particle size of $10\mu$ to $20\mu$.

With the aid of the presently disclosed method, the setting times of the hard plasters can be further shortened and the bending tensile strength of the plaster can be increased. Moreover, the addition of strength reducing accelerators is no longer necessary since the resulting hard plasters are themselves highly active and set very quickly.

It is to be understood that both the foregoing general description and the following detailed description are exemplary, but are not restrictive of the invention.

DETAILED DESCRIPTION OF THE INVENTION

The technique of hydrothermal recrystallization is described in detail in the previously cited U.S. Pat. Nos. 3,913,571 and 3,337,298, hereby incorporated by reference. In the present invention, the step can be carried out in any apparatus suitable for this purpose, particularly an autoclave. Calcium sulfate dihydrate is introduced into the apparatus, generally in the form of a slurry or suspension so that it may be pumped, thus also enabling a continuous or quasi-continuous conversion process. The pH of the dihydrate is adjusted with a suitable acid, such as sulfuric acid, so that it is less than or equal to about 3. The dihydrate is then heated with steam to cause the recrystallization.

The recrystallization process is carried out to convert 95% to 99% by weight of the calcium sulfate dihydrate into alpha calcium sulfate hemihydrate, the remainder being non-recrystallized calcium sulfate dihydrate. The axial ratio (thickness:length) of the resulting alpha hemihydrate crystals is controlled to be from 1:8 to 1:12.

The axial ratio of the alpha calcium sulfate hemihydrate crystals can be influenced in various ways during the conversion of the dihydrate into hemihydrate. One or more methods can be used to control the axial ratio, and include temporarily increasing the temperature of the reaction mixture, reducing the addition of substances which influence crystal growth and the crystal structure, and temporary local supersaturation of the reaction mixture with sulfuric acid. An increase of the temperature by about 3° to 4° C. over a period of time of about 30 minutes—such as increasing an operating temperature of 123° C. to 126°-127° C.—is an example of such a method. Controlled steam heating to set the reactor temperature has been found to be very satisfactory in this connection.

If crystal growth (axial ratio) is to be controlled by way of a substance which influences crystal structure, such as carboxymethylcellulose (cmc) or maleic anhydride, the quantity of substance which is added is reduced for about 20 to 30 minutes, to, for example, one sixth to one eighth of the quantity customarily added. Analogous results are obtained with the addition of, for example, sulfuric acid with a concentration of 60% $H_2SO_4$ by weight within a period of 1 to 2 minutes. Measures for controlling the crystal growth of calcium sulfate hemihydrate are disclosed in German Pat. No. 1,592,121 or Great Britain Pat. No. 1,243,092, which are hereby incorporated by reference. The present invention takes advantage of this preferred crystal growth.

The hydrothermal recrystallization can be performed continuously or quasi-continuously (batch-wise). The aqueous suspension of calcium sulfate dihydrate, which is fed into the autoclave at the end of the quasi-continuously carried out hydrothermal recrystallization is not converted to alpha calcium sulfate semihydrate. This calcium sulfate dihydrate leaves the autoclave unchanged.

Thes prevention of recrystallization can be executed in a simple way by lowering the temperature in the reaction vessel below the recrystallization temperature, for example to 105° C., before the calcium sulfate dihydrate is fed in to the autoclave. Under this conditions a conversion of calcium sulfate dihydrate to alpha calcium sulfate semihydrate not takes place. By determination the number of alpha-calcium sulfate-semihydrate crystals and number of calcium sulfate dihydrate crystals the ration of semihydrate to dihydrate can be controlled with a microscope.

The methods for regulating an axial ratio of 1:8 to 1:12 are simple and must be controlled by the microscopial observation results. If the crystals, for example are to short, the temperature is increased over a short period of time and/or the amount of substances which influence crystal growth and crystal structure is reduced temporary and/or a temporary local supersaturation in the reaction mixture is induced by addition an acid.

An influence of the axial ratio takes place also at the beginning of the hydrothermal recrystallization. The parameters which regulate the axial ration are given. But an exact regulation of the desired axial ratio takes places by temporarily changes of the temperature, and/or concentration of acid in the reaction mixture and/or concentration of substances, which influence crystal growth in a later phase. The regulation is made, when the autoclave is filled for example to 50-60%.

The mixture of alpha calcium sulfate hemihydrate and non-recrystallized calcium sulfate dihydrate is then separated from the mother liquor by methods such as filtration and centrifugation. The mixture may also be washed by known methods.

This mixture is then treated in a drying or calcining assembly, to cause the calcination of non-recrystallized dihydrate into beta calcium sulfate hemihydrate and also to dry the alpha hemihydrate. By this process, at least 90% of the dihydrate should be converted, so that no more than 0.5% of the total weight of the calcium sulfate remains in dihydrate form.

An apparatus suitable for drying and/or calcining is disclosed in German Auslegeschrift No. 2,006,366. The moist calcium sulfate hemihydrate separated from the mother liquor is directly introduced into a hot gas stream in a hot shaft which connects the separating system and the further processing system. The double-walled shaft walls are heated by the hot gas stream prior to the entrance of the moist calcium sulfate mixture. The mixture is conducted in this direct stream into the further processing system.

The temperature of the hot gas entering the double shaft will usually be about 500° C. but may, depending on the size and consistency of the drier, be somewhat lower or higher. The gas leaves the stream drier at a temperature of about 130° C. to about 160° C. In any event, the temperature of the hot gas entering the double shaft must be selected to be high enough to produce a powdery alpha calcuim sulfate hemihydrate which leaves the stream drier while avoiding and sticking and which contains about 1-5 percent by weight beta calcium sulfate hemihydrate as well as traces of calcium sulfate dihydrate. The water of crystallization content must not be above 6.0% by weight.

It has also been found that the advantages of the hard plaster mixtures produced by the present process can be augmented by grinding the plaster after the drying/calcining step to an average grain size of no more than $20\mu$. Further, it has been found advisable to comminute part of the hard plaster in ball mills whereby highest amount in ball mills is 80%, and part of it in beater mills. Minimum in beater mills is 20%.

Grinding is effected in such a way that the average grain size of the product is 10 to $20\mu$, preferably 14 to $16\mu$. The fine component particles less than $5\mu$ are present in a maximum quantity of 30%, and the coarse component particles above $20\mu$ are present at a quantity of about 30%.

The improvement in properties of the calcium sulfate produced by the present process is attributed to the fact that not all of the calcium sulfate dihydrate which is introduced, continuously or quasi-continuously into the hydrothermal recrystallization process, is converted to alpha calcium sulfate hemihydrate. A remainder of 1 to 5 percent by weight calcium sulfate dihydrate remains in the reaction mixture, and after separation from the mother liquor, and, if desired, a washing process, this dihydrate is converted to beta calcium sulfate hemihydrate in the drying and/or connected calcining assembly. The degree of calcination of the dihydrate is controlled to be at least 90% so that calcium sulfate dihydrate seeds remain in the interior of the beta hemihydrate particles which result from the calcination. These seeds act as accelerators during the rehydration. The conversion is controlled under microscope (Phasenkontrastmikroskop) by dying the crystals with a solution of cinnamic aldehyde. Dihydrate crystalls are blue-coloured, alpha-semihydrate rose-coloured and β-semihydrate pale-rose.

Further, the fine particles which result from the grinding process also act as seeds. Thus, the fine particle seeds and the dihydrate seeds both act to produce an early start to the reaction, and consequently, a short setting time. In addition, the coarse particles from the grinding process significantly contribute to the higher bending tensil strength of the plaster, and at the same time, keep the exothermal start of the reaction from being excessive.

When producing plaster casts for employment in water also, melamine resins are often added to the plaster to produce hydrophobic properties and to increase the strength of the cast. However, the melamine resin has a drawback in that it decreases the setting rate of the plaster. The acceleration of setting resulting from the method of the present invention cancels out this delaying effect without a loss in strength.

The above described method of the present invention can also be used to shorten the setting times of chemical plasters made from pebble and kola phosphates.

The following example will serve to explain the invention in detail. All percentages are by weight.

EXAMPLE

An aqueous suspension of calcium sulfate dihydrate at a concentration of 200 g/l was pumped continuously into an autoclave of a capacity of 20 m$^3$ with a rate of 2.5 m$^3$/h. With the addition of about 0.01% sulfuric acid (calculated as 100% H$_2$SO$_4$) referred to calcium sulfate hemihydrate, the pH was adjusted to 3.0 and the dihydrate that had been pumped in was recrystallized into needle-shaped alpha calcium sulfate hemihydrate by directly heating it with steam to 110° C. When the autoclave was filled with 3 m$^3$, 0.04% by weight carboxymethylcellulose referred to calcium sulfate semihydrate was added in the form of a 2% solution while continuing the pumping. Until the autoclave was filled (80–90 Vol.%), there was a tendency to form crystals with an axial ratio of 1:8 to 1:12. Shortly before out-put of the reaction mixture, the temperature in the autoclave was lowered to 106°–107° C. With an output rate of about 2.5 m$^3$ per hour, the alpha hemihydrate suspension at 106°–107° C. contained about 2% non-recrystallized dihydrate. The suspension was transferred to a connected decanting centrifuge where the mother liquor was separated from the mixture of solids. The moist alpha calcium sulfate hemihydrate and small amounts of calcium sulfate dihydrate, contained in the solid mixture were dried and calcined, respectively, in the subsequent stream drying system which used a hot gas temperature of about 500° C. and an exhaust gas temperature of 165° C. The water of crystallization content of the resulting dry substance was 6.0%. The alpha calcium sulfate hemihydrate powder containing 1.5 to 2% beta hemihydrate and traces (0.2%) of calcium sulfate dihydrate, and was then ground in a ball mill to an average grain size of 14μ.

After grinding, the resulting hard plaster, without the addition of any additives and with a water-plaster factor of 0.5, had a setting time of 2½ minutes.

It will be understood that the above description of the present invention is susceptible to various modifications, changes and adaptations, and the same are intended to be comprehended within the meaning and range of equivalents of the appended claims.

What is claimed is:

1. A method for producing fast-setting alpha calcium sulfate hemihydrate from calcium sulfate dihydrate, comprising:

(a) hydrothermally recrystallizing, at a pH less than or equal to 3, in the presence of a substance which influences the tendency to form crystals, calcium sulfate dihydrate, to form a mixture comprising 95% to 99% by weight of alpha calcium sulfate hemihydrate having an axial ratio of 1:8 to 1:12, and 1% to 5% calcium sulfate dihydrate;
    (b) treating the mixture by drying said hemihydrate and calcining the dihydrate to form beta calcium sulfate hemihydrate while leaving a remainder of dihydrate, said calcining leaving no more than 0.5% by weight of the total calcium sulfate in dihydrate form; and
    (c) grinding the treated mixture to an average grain size of 10μ to 20μ.

2. The process of claim 1 wherein the grinding takes place in a ball mill.

3. The process of claim 1 wherein the grinding takes place in a beater mill.

4. The process of claim 1 wherein a part of the treated mixture is ground in a ball and a part of the treated mixture is ground in a beater mill.

5. The method of claim 1 wherein said grinding takes place to an average particle size of 4μ to 16μ.

6. The process of claim 1 wherein the mixture is washed prior to the treating step.

7. The method of claim 1 wherein the hydrothermal recrystallization is conducted as a continuous or quasi-continuous process.

8. The method of claim 1 wherein the temperature of hydrothermal recrystallization is increased by about 3° or 4° C. over a period of time about 30 minutes.

9. The process of claim 1 wherein the substance which influences the tendency to form crystals is carboxymethylcellulose or maleic anhydride.

10. The process of claim 1 wherein the treating step is carried out in a stream drier.

11. The process of claim 10 wherein the temperature of the gas entering the stream drier is about 500° C., and the temperature of the gas leaving the stream drier is about 130° to about 160° C.

12. The method of claim 1 wherein the water of crystallization content of the treated mixture is no more than 6.0% by weight.

13. Hard plaster of paris grain comprising 95% to 99% by weight alpha calcium sulfate hemihydrate, 0.5% to 4.5% by weight beta calcium sulfate hemihydrate, and calcium sulfate dihydrate, the calcium sulfate dihydrate being present in a maximum of 0.5% by weight calcium sulfate dihydrate, the hard plaster of paris having an average grain size of 10μ to 20μ.

14. The hard plaster of paris of claim 13 having an average grain size of 14μ to 16μ.

15. The hard plaster of paris of claim 13 wherein a maximum of 30% of the particles have a size of less than 5μ, and about 30% of the particles have a size of more than 20μ.

* * * * *